United States Patent [19]

Rübig et al.

[11] Patent Number: 4,878,420

[45] Date of Patent: Nov. 7, 1989

[54] ARRANGEMENT FOR CLIMATE CONTROL IN PASSENGER SPACES OF POWER VEHICLES

[75] Inventors: Heinz Rübig, Bühl-Eisenthal; Thomas Carolus, Achern, both of Fed. Rep. of Germany

[73] Assignee: Robert Bosch GmbH, Stuttgart, Fed. Rep. of Germany

[21] Appl. No.: 272,543

[22] Filed: Nov. 16, 1988

[30] Foreign Application Priority Data

Nov. 24, 1987 [DE] Fed. Rep. of Germany ....... 3739737

[51] Int. Cl.$^4$ .............................................. B60H 1/24
[52] U.S. Cl. ...................................... 98/2.08; 137/875
[58] Field of Search ........................... 98/2, 2.08, 2.11; 137/875

[56] References Cited

U.S. PATENT DOCUMENTS

| 1,825,103 | 9/1931 | Stacey, Jr. | 137/875 |
| 2,984,255 | 5/1961 | Katzenberger | 137/875 |
| 3,270,775 | 9/1966 | Alderson | 137/875 X |

Primary Examiner—Harold Joyce
Attorney, Agent, or Firm—Michael J. Striker

[57] ABSTRACT

An arrangement for a climate control in passenger spaces of power vehicles comprises a passage for supplying an air stream, two other passages located downstream of the first-mentioned passage, a branching located between the first-mentioned passage and the further passages, a flap-like member located in the region of the branching and movable between two end positions in each of which it closes a respective one of the further passages, the flap-like member having an end which faces toward the first-mentioned passage and being provided at the end with an auxiliary blade which extends over an essential part of a length of the member.

10 Claims, 1 Drawing Sheet

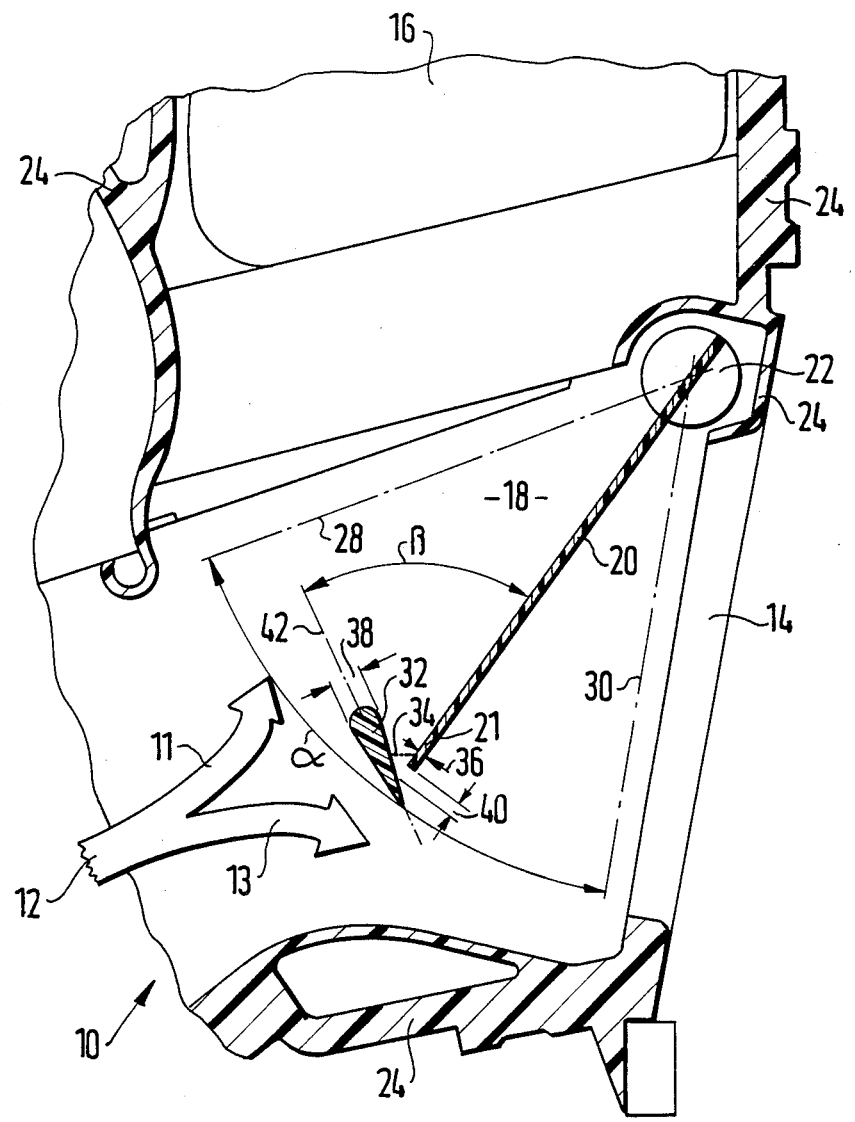

ARRANGEMENT FOR CLIMATE CONTROL IN PASSENGER SPACES OF POWER VEHICLES

BACKGROUND OF THE INVENTION

The present invention relates to an arrangement for a climate control in passenger spaces of power vehicles. More particularly, it relates to such an arrangement which has a supply passage for supplying an air stream, two further passages, and a flap like member arranged in the region of branching between the first mentioned passage and the further passages and turnable between two end positions in which it respectively closes one of the further passages.

Arrangements of the above mentioned general type are known in the art. For reducing a flow noise, it has been known to propose climate control arrangements in which the flap like member at its end which faces away of the supplied air stream, is rounded. However, it has been recognized that these measures are not sufficient to satisfy increased requirements as to the noise control.

SUMMARY OF THE INVENTION

Accordingly, it is an object of the present invention to provide an arrangement for climate control of passenger spaces in power vehicles, which avoids the disadvantages of the prior art.

More particularly, it is an object of the present invention to provide an arrangement of the above mentioned general type, in which the above mentioned noise can be completely eliminated or at least in especially severe cases reduced to an acceptable value.

In keeping with these objects and with others which will become apparent hereinafter, one feature of the present invention resides, briefly stated, in an arrangement in which the flap-like member is provided, at its end which is opposite to the air stream, with an auxiliary blade which extends over an essential part of the length of the flap-like member.

When the arrangement is designed in accordance with the present invention it achieves the above specified objects.

In accordance with another feature of the present invention the auxiliary blade can extend over the whole length of the flap-like member.

The auxiliary blade can be arranged at a distance from the end of the flap-like member which is spaced from a turning bearing supporting the flap-like member for its turning between two end positions.

The auxiliary blade can have a droplet-shaped contour or a wing-shaped contour, and fixedly connected with the flap-like member.

The thickness of the flap-like member at its end which faces toward the auxiliary blade can be equal to the maximum thickness of the auxiliary blade. On the other hand, the maximum thickness of the auxiliary blade can be greater or smaller than the thickness of the flap-like member at its end which faces toward the auxiliary blade.

The flap-like member at its end which faces away of the auxiliary blade, can be turnably supported in a wall which surrounds the respective passage.

Finally, the auxiliary blades can form with an axis of the flap-like member, which is radial to the turning bearing, an angle which is different from a right angle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view which schematically shows a section of a part of an arrangement for climate control in passenger spaces of power vehicles.

DESCRIPTION OF A PREFERRED EMBODIMENT

An arrangement for a climate control for a passenger space of a power vehicle has a passage 10 for guiding an air stream in direction of the arrow 12. As can be seen from the drawing, the passage 10 branches into passages 14 and 16.

A flap-like member 20 is turnably supported in the region of a branching 18 of the passage 10. For this purpose the flap-like member 20 has a turning bearing 22 located relative to the member 20 at its side which is opposite to the air stream 12. The support of the flap-like member 20 is formed in a passage wall 24 which surrounds the branching region 18. The flap 20 is turnable over an angle α between two reversing positions 28 and 30 identified with dash-dot lines. In the above mentioned reversing positions the flap-like member 20 closes the branching passages 14 and 16, respectively. The flap-like member 20 is fixable in each turning position. In an intermediate position which is shown in the drawing, a separation of the air stream into partial streams 11 and 13 is performed. Each of the partial streams 11 and 13 flows into the branching passages 14 and 16, respectively.

For avoiding disturbing flow noise, the flap-like member 20 is provided at its end 30 which faces toward the air stream 12 with an auxiliary blade 32. The blade extends over an essential part of the length of the flap 20. The length can be seen from the extension of the flap in the plane of the drawing, as an example. Depending on given conditions, it can be of advantage when the longitudinal extension of the auxiliary blade 32 is shorter than the length of the flap 20. In many cases, however, the length of the auxiliary blade 32 can correspond to the length of the flap 20.

As can be further seen from the drawing, the auxiliary blade 32 is arranged at a distance from the free end 21 of the flap 20. In other words, it is arranged at the end of the flap-like member 20, which faces away of the turning bearing 22. For better visibility, in the example shown in the drawing, the connection between the flap-like member 20 and the auxiliary blade 32 is identified only with a dash-dot line and identified with reference numeral 34. Normally, the connection is performed by braces in the region of the longitudinal end portion which extends from the end 21 of the flap-like member to the auxiliary blade 32. It should be understood that the brace 34 has a cross-section which is favorable for flow conditions.

As shown in the drawing, the auxiliary blade 32 has a droplet-shaped outer contour. It is however recommended to form the auxiliary blade with a so-called wing contour or a similar contour. The thickness 36 of the flap-like member 20 in its end portion 21 which faces toward auxiliary blade 38 corresponds maximum to the maximal thickness 38 of the auxiliary blade 32. It is very important that the auxiliary blade 32 is located at a predetermined distance 40 from the end 21 of the flap-like member 20 facing toward the same.

In accordance with another feature of the invention, the avoidance of disturbing noise is further improved when an axis of symmetry 42 of the auxiliary blade 32 which extends through the cross-section of the auxiliary blade 32, forms with the axis of the flap 20 which is radial to the turning bearing 22 such an angle $\beta$ which is different from a right angle. For the contours which have an asymetrical cross-section this is true for an axis which in direction of the width of the contour intersects the points which are spaced from one another by a maximum distance.

It will be understood that each of the elements described above, or two or more together, may also find a useful application in other types of constructions differing from the types described above.

While the invention has been illustrated and described as embodied in an arrangement for a climate control in passenger spaces of power vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for a climate control in passenger spaces of power vehicles, comprising a passage for supplying an air stream; two further passages located downstream of said first-mentioned passage; a branching located between said first-mentioned passage and said further passages; a flap-like member located in the region of said branching and movable between two end positions in each of which it closes a respective one of said further passages, said flap-like member having an end which faces toward said first-mentioned passage and being provided at said end with an auxiliary blade which extends over an essential part of a length of said member; and a turning bearing arranged to support said flap-like member turnably between said positions, said flap-like member having an end which faces away of said turning bearing, said auxiliary blade being arranged at a distance from said end of said flap-like member.

2. An arrangement as defined in claim 1, wherein said auxiliary blade has a length which corresponds to the length of said flap-like member.

3. An arrangement as defined in claim 1, wherein said auxiliary blade has a droplet-like outer contour.

4. An arrangement as defined in claim 1, wherein said auxiliary blade has a wing-like contour.

5. An arrangement as defined in claim 1, wherein said auxiliary blade is fixedly connected with said flap-like member; and further comprising means for fixedly connecting said auxiliary blade with said flap-like member.

6. An arrangement as defined in claim 1, wherein said auxiliary blade has a predetermined maximum thickness, said flap-like member having an end which faces toward said auxiliary blade and has a thickness corresponding to said maximum thickness of said auxiliary blade.

7. An arrangement as defined in claim 1, wherein said flap-like member has an end which faces toward said auxiliary blade and has a predetermined thickness, said auxiliary blade having a maximum thickness which is greater than said thickness of said end of said flap-like member.

8. An arrangement as defined in claim 1, wherein said flap-like member has an end which faces toward said auxiliary blade and has a predetermined thickness, said auxiliary blade having a maximum thickness which is smaller than the thickness of said end of said flap-like member.

9. An arrangement as defined in claim 1; and further comprising a wall which surrounds said passages, flap-like member having an end which faces away of said auxiliary blade and is turnably supported in said wall.

10. An arrangement as defined in claim 1 wherein and said flap-like member has an axis which is radial to said turning bearing, said auxiliary blade forming with said axis an angle which is different from a right angle.

* * * * *